US006573087B2

(12) United States Patent
Lehr

(10) Patent No.: US 6,573,087 B2
(45) **Date of Patent: *Jun. 3, 2003**

(54) PACKAGED TIMED RELEASE MICROORGANISMS AND ABSORBENT MATRIX FOR DEGRADATION OF HYDROCARBONS

(76) Inventor: William F. Lehr, 100 Lewis Dr., Unit 10-A, Greenville, SC (US) 29605

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,113

(22) Filed: Jul. 6, 1999

(65) Prior Publication Data

US 2002/0048807 A1 Apr. 25, 2002

(51) Int. Cl.[7] .............................. B09B 3/00; C02F 3/00; C12M 1/00; C12N 1/00; C12N 1/20

(52) U.S. Cl. .................... 435/262.5; 210/600; 210/601; 210/610; 435/252.1; 435/283.1; 435/822

(58) Field of Search ................................ 210/600, 601, 210/610; 435/252.1, 262, 262.5, 283.1, 822

(56) References Cited

U.S. PATENT DOCUMENTS 3,860,490 A * 1/1975 Guttag ....................... 195/108
5,039,414 A * 8/1991 Mueller et al. ............. 210/610
5,186,831 A * 2/1993 DePetris .................. 210/242.4
5,609,768 A * 3/1997 Mueller et al. ............. 210/691
5,807,724 A * 9/1998 Resnick ...................... 435/177
5,906,960 A * 5/1999 Sanjay et al. ............... 502/401

* cited by examiner

*Primary Examiner*—David M. Naff
*Assistant Examiner*—Deborah K. Ware
(74) *Attorney, Agent, or Firm*—Ralph Bailey

(57) ABSTRACT

An absorbent package for containment and bioremediation of hydrocarbons and method thereof are disclosed. The package comprises a concentration of microorganisms, a timed release mechanism including a time release capsule, a matrix of fibrous material which is hydrophobic and oleophilic, and a porous casing. The fibrous material may be selected from synthetic fibers and cellulose fibers for storing accumulation of hydrocarbons. The method includes positioning a concentration of microorganisms capable of degradation of the hydrocarbons. Further, the method also provides the matrix which is absorbent, and such method includes filling the casing with the matrix and the microorganisms to form a hydrocarbon containment and degradation package. Then the method employs the action of absorbing and storing hydrocarbons passing through the casing and wicking hydrocarbons via capillary action through the matrix and absorbing the hydrocarbons into the matrix. The microorganisms degrade the hydrocarbons therein in order to avoid environmental pollution.

17 Claims, 1 Drawing Sheet

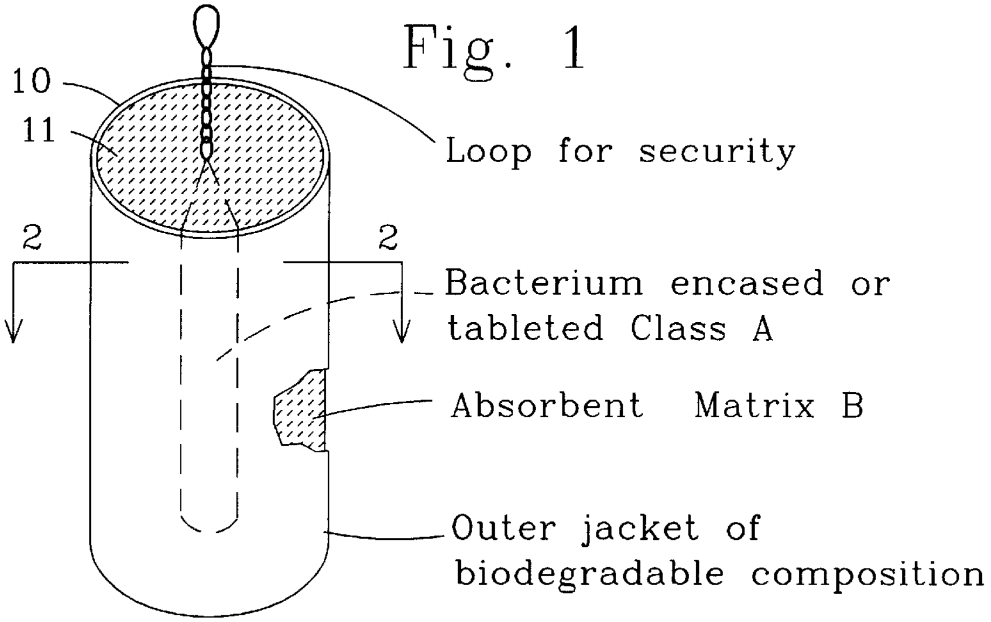
Fig. 1
Fig. 2
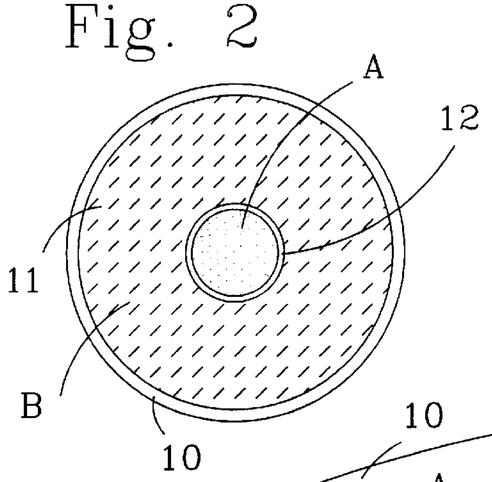
Fig. 3
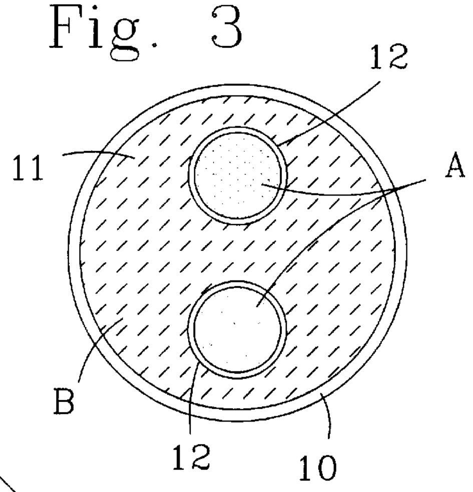
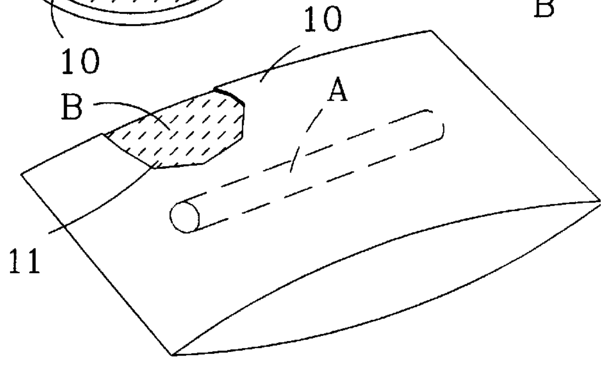
Fig. 4

PACKAGED TIMED RELEASE MICROORGANISMS AND ABSORBENT MATRIX FOR DEGRADATION OF HYDROCARBONS

BACKGROUND OF THE INVENTION

This invention relates to a device and method for absorption, retention, and biomediation of hydrocarbons to avoid pollution especially such as may result from marine oil and fuel spills.

In addition to booms for controlling oil tanker spills and the like, there has long been a need for a bilge or sump oil absorber that combines the advantages of high absorbency and containment properties of melt blown polypropylene absorbents presently on the market with the bioremediation properties of systems containing bacteria that consume, over a period of time, accumulated hydrocarbons.

Polypropylene and similar absorbents have disadvantages in that they do not consume or remediate hydrocarbons but simply trap them and, as a result, must be disposed of as either hazardous waste or, in a case where they meet certain criteria may end up in a landfill where resulting pollution is passed from water to land.

Bioremediation products on the market which include a microbial component such as hydrocarbon neutralizing bacteria do degrade relatively small amounts of hydrocarbons but cannot handle large amounts as might result, for example, from a sudden release of fuel/oil into the bilge or sump of a boat. If exposed to large quantities of hydrocarbons the microbial materials are usually overwhelmed and killed.

SUMMARY OF THE INVENTION

Accordingly, it is an important object of the invention to provide a device for absorbing large quantities of hydrocarbons for controlled bioremediation over time.

Another object of the invention is to provide a bioremediating device and method wherein large amounts of hydrocarbons may be extracted as from an external spill and stored for breakdown in a controlled sequence over a period of time. After remediation has progressed within the device biologically active material may escape so as to further treat remaining external hydrocarbons thus further protecting the environment from hydrocarbon pollution.

The invention contemplates combining high absorbency characteristics of products like polypropylene to facilitate a timed release of bacteria specific to degrading hydrocarbons. Large external accumulations of hydrocarbons are absorbed by an outside matrix of polypropylene or cellulose which may contain nutrients and microbial organisms. The matrix primary function is to retain an accumulation of hydrocarbons and to wick them by capillary action into the core in juxtaposed relation therewith where a concentrated source of bacteria are released on a time controlled basis to consume the accumulation of absorbed hydrocarbons which over time are broken down to more benign material.

Highly absorptive forms of recycled cellulose have been found to be in the order of about 90% as efficient as melt blown polypropylene for absorbing hydrocarbons and would allow the entire device to biodegrade as in a landfill. The necessary components for operation of the device include water, oxygen, nutrients, bacteria or other suitable organisms and the hydrocarbons.

While the invention has been described in the context of a bilge or sump oil absorber many uses will be found for the device and method of the invention including controlling and bioremediating many larger spills and the like on land as well as water.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a schematic perspective view illustrating a bilge absorber constructed in accordance with the invention;

FIG. 2 is a sectional plan view taken on the line 2—2 in FIG. 1 illustrating a single core centrally located in respect to a matrix;

FIG. 3 is a sectional plan view, similar to FIG. 2, illustrating a modified form of the invention wherein more than a single core are in juxtaposition in respect to a surrounding matrix; and FIG. 4 is a perspective view illustrating another modified form of the invention wherein the matrix is pillow shaped with core material centrally located therein for efficient naturalization of fuel and oil spills.

DESCRIPTION OF A PREFERRED EMBODIMENT

A high absorbency device and method is described and illustrated for containment and bioremediation of hydrocarbons. Referring to the drawings a core member A contains microbial organisms preferably bacteria capable of degrading hydrocarbons. The core member has a mechanism for controlled release of the microbial organisms therefrom when contacted by hydrocarbons. A matrix B of highly absorbent material contains the core member. The matrix includes hydrophobic, oleophilic material for containing an accumulation of hydrocarbons from an external source and wicking hydrocarbons from said accumulation into contact with the core member thereby triggering controlled release of the microbial organisms from the core member for wicking into the matrix and thereby into contact with the accumulation of hydrocarbons for controlled degrading thereof. Thus, the hydrocarbons are absorbed into the matrix and accumulated therein for controlled reduction by the action of the microbial organisms into a more benign material thereby avoiding environmental pollution.

The device and method contemplate reducing contamination resulting from the untoward release or undesired accumulation of petroleum based hydrocarbons so that they may be absorbed, entrapped in large volume and bioremediated, in situ, by the combination of high absorbency cellulose or melt blown polypropylene with a controlled or timed release bacterial source, reacting with the hydrocarbons to render them into material of reduced toxicity.

Heretofore, only high capacity absorbents, such as melt blown polypropylene which do not bioremediate hydrocarbons but simply entrap them for later disposal and other bioremediating structures on the market offer bioremediation capabilities for small quantities of hydrocarbon but cannot handle larger quantities as they are overwhelmed or poisoned when confronted with relatively large quantities of hydrocarbon.

Referring more particularly to the drawings, an outer cover or sac 10 preferably of cotton textile material, but which may be of any other porous material, is used as a casing that is filled with a special form of treated cellulose 11, which absorbs only oils not water, is impregnated with a release capsule, water activated tablet, bag or suitable container 12 which is included in the core A for timed or controlled release of bacteria once the absorbed hydrocarbons come into contact with core material. The capsule containing bacteria of the genus Pseudomonas, Candida, Geatriclum, Actinomucor or other suitable genus and variations that consume hydrocarbon and sufficient nutrients in the form of nitrogen, phosphorous and potassium is activated by the hydrocarbon releasing the bacteria. At this point, the bacteria immediately begin to consume the hydrocarbon material and multiply consuming all available hydrocarbon as food thereby increasing their rate of multiplication. When constructed of all natural material, this structure is entirely reduced to benign material when disposed of in the trash.

A suitable core material B may include concentrated biologically active material which comprises microbial organisms, preferably bacteria, and nutrients such as disclosed, for example, in U.S. Pat. No. 5,609,667 or U.S. Pat. No. 5,807,724 disclosing seedlings having concentrations of microbial organisms encapsulated in a timed release mechanism comprising beeswax. Such material provides a mechanism for controlled release of microbial organisms when contacted by water and the hydrocarbons. A core is a concentration of biologically active material and may be contained as in a tea bag 12, tablets or pellets or otherwise collected for contacting or placed in juxtaposition with a matrix. A single core or multiple cores may be utilized in practicing the invention as illustrated in FIG. 3. A pillow shaped matrix containing the core also provides an efficient configuration for reducing hydrocarbon spills.

Suitable material for the matrix A includes melt blown polypropylene fibers such as described in U.S. Pat. No. 5,692,547 or other highly absorbent plastic material. The melt blown polypropylene is described as fibers of a high surface to weight ratio so as to be capable of absorbing up to twenty times its own weight. Naturally occurring highly absorbent material includes cellulosic fibers material which is biodegradable. For example, a cellulosic material, Cell-U-Sorb marketed by Product Services Marketing Group of 20354 Empire Avenue, Suite D1, Bend, Oreg. 97701 is highly absorbent. These absorbent materials are exemplary of suitable matrix materials. Biodegradable matrix material is preferred because an entire device may be constructed so as to be reduced essentially to carbon dioxide and water. As used herein the word absorbent is used in its broadest sense meaning to suck up or to collect. While it is necessary that the matrix B be in juxtaposition in respect to the core B to carry out the wicking and bioremediating functions described herein it is not essential that the matrix surround the core or be in any particular geometric relation to each other.

Thus wicking by capillary action of the fibers avoids pooling of the hydrocarbons as would occur in a cellular structure, permitting oxygen, water and nutrients to aid the microbial materials in consuming the hydrocarbons avoiding exposure of the microbial materials to quantities of hydrocarbons as would kill the microbial materials.

While a preferred embodiment of the invention has been described using specific terms, such description is for illustrative purposes only, and it is to be understood that changes and variations may be made without departing from the spirit or scope of the following claims.

What I claimed is:

1. An absorbent package for containment and bioremediation of hydrocarbons in water comprising:

a concentration of microbial organisms capable of degrading hydrocarbons;

a timed release mechanism for containing said concentration of microbial organisms, wherein upon activation said timed release mechanism controllably releases said concentration of microbial organisms;

an absorbent matrix of hydrophobic, oleophilic fibrous material selected from the group consisting of synthetic fibers and cellulose fibers for storing an accumulation of hydrocarbons, whereby hydrocarbons wick by capillary action into said absorbent matrix contacting said concentration of microbial organisms wherein said absorbent matrix controls microbial hydrocarbon degradation by permitting oxygen, water, and nutrients to aid hydrocarbon consumption by said concentration of microbial organisms; and a porous casing, filled with said absorbent matrix and said concentration of microbial organisms having a timed release mechanism, said porous casing forming a package through which hydrocarbons pass into said absorbent matrix whereby the hydrocarbons are absorbed into said absorbent matrix and accumulated therein for controlled degradation by said concentration of microbial organisms into a benign material.

2. The absorbent package set forth in claim 1, wherein said absorbent matrix comprises a hydrophobic, oleophilic cellulosic biodegradable material.

3. The absorbent package set forth in claim 1, wherein said absorbent matrix comprises a hydrophobic, oleophilic fibrous melt-blown polypropylene material.

4. The absorbent package set forth in claim 1, wherein said concentration of microbial organisms are contained within said timed release mechanism.

5. The absorbent package set forth in claim 1, for use as a bilge or sump oil absorber.

6. The absorbent package set forth in claim 1, wherein a single core is centrally located within the matrix.

7. The absorbent package set forth in claim 6, wherein said core and said absorptive matrix are elongated having a generally circular cross section.

8. The absorbent package set forth in claim 6, wherein said core is contained in a thin, flattened matrix.

9. The absorbent package set forth in claim 1, wherein said timed release mechanism further comprises at least one timed release capsule.

10. The absorbent package set forth in claim 9, wherein said timed release capsule further comprises a core member having nutrient material.

11. The absorbent package set forth in claim 1, wherein said concentration of microbial organisms are bacteria selected from the genus of Psuedomonus, Candida, Geatriculum, and Actinomucor capable of hydrocarbon consumption.

12. The absorbent package set forth in claim 1, wherein said concentration of microbial organisms further comprises a plurality of dispersed microbial organisms.

13. A method of absorbing hydrocarbons in water for containment and bioremediation comprising the steps of:

positioning a concentration of microbial organisms capable of degrading hydrocarbons having a timed release mechanism for controlled release of said concentration of microbial organisms for contact with hydrocarbons in juxtaposition in a matrix;

providing an absorbent matrix of hydrophobic, oleophilic fibrous material selected from the group consisting of synthetic fibers and cellulosic fibers for storing an accumulation of hydrocarbons and for wicking the hydrocarbons by capillary action into contact with said concentration of microbial organisms for controlled hydrocarbon degradation whereby said absorbent matrix permits oxygen, water and nutrients to aid the microbial hydrocarbon degradation;

filling a porous casing with said absorbent matrix material and said concentration of microbial organisms forming a hydrocarbon containment and degradation package;

absorbing and storing an accumulation of hydrocarbons passing through said porous casing into said absorbent matrix;

wicking hydrocarbons via capillary action through said absorbent matrix into contact with said concentration of microbial organisms; and engaging said concentration of microbial organisms with the accumulation of hydrocarbons for controlled hydrocarbon degradation whereby the hydrocarbons are absorbed into said absorbent matrix material and accumulated therein for hydrocarbon degradation by the action of said concentration of microbial organisms into a more benign material for avoiding environmental pollution.

14. The method of absorbing hydrocarbons in water for containment and bioremediation set forth in claim 13, wherein said concentration of microbial organisms are bacteria selected from the genus of Psuedomonus, Candida, Geatriculum, and Actinomucor capable of hydrocarbon consumption.

15. The method of absorbing hydrocarbons in water for containment and bioremediation set forth in claim 13, wherein said timed release mechanism further comprises a timed release capsule.

16. The method of absorbing hydrocarbons in water for containment and bioremediation set forth in claim 15, wherein said timed release capsule further comprises a core member having nutrient material.

17. The method of absorbing hydrocarbons in water for containment and bioremediation set forth in claim 13, wherein said concentration of microbial organisms further comprises a plurality of dispersed microbial organisms.

* * * * *